（12） United States Patent
Murayama

(10) Patent No.: US 12,358,495 B2
(45) Date of Patent: Jul. 15, 2025

(54) PARKING ASSISTANCE DEVICE

(71) Applicant: Faurecia Clarion Electronics Co., Ltd., Saitama (JP)

(72) Inventor: Junya Murayama, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 311 days.

(21) Appl. No.: 17/986,191

(22) Filed: Nov. 14, 2022

(65) Prior Publication Data

US 2023/0159021 A1 May 25, 2023

(30) Foreign Application Priority Data

Nov. 19, 2021 (JP) .................................. 2021-188385

(51) Int. Cl.
*B60W 30/06* (2006.01)
*B60W 60/00* (2020.01)

(52) U.S. Cl.
CPC .......... *B60W 30/06* (2013.01); *B60W 60/001* (2020.02); *B60W 2554/80* (2020.02)

(58) Field of Classification Search
CPC ............... B60W 30/06; B60W 60/001; B60W 2554/80; B62D 15/0285
See application file for complete search history.

(56) References Cited

U.S. PATENT DOCUMENTS

| | | | |
|---|---|---|---|
| 2013/0085637 A1* | 4/2013 | Grimm | B62D 15/0285 701/25 |
| 2013/0162829 A1* | 6/2013 | Kadowaki | B60R 1/27 348/148 |
| 2015/0179075 A1* | 6/2015 | Lee | G08G 1/165 340/932.2 |
| 2017/0028914 A1* | 2/2017 | Kiyokawa | G01C 21/3415 |
| 2017/0029028 A1* | 2/2017 | Kiyokawa | G08G 1/168 |
| 2017/0259850 A1* | 9/2017 | Yamashita | B62D 6/00 |
| 2020/0346639 A1 | 11/2020 | Tashiro et al. | |
| 2020/0369262 A1* | 11/2020 | Suzuki | G06V 20/586 |
| 2021/0370918 A1* | 12/2021 | Hidaka | B60W 30/06 |
| 2021/0380097 A1* | 12/2021 | Tokuhiro | B60W 50/14 |
| 2023/0103099 A1* | 3/2023 | Tomozawa | B62D 15/0285 701/23 |
| 2023/0108530 A1* | 4/2023 | Tomozawa | B60W 30/18109 701/23 |

FOREIGN PATENT DOCUMENTS

JP 2019-127112 A 8/2019

* cited by examiner

*Primary Examiner* — Mussa A Shaawat
(74) *Attorney, Agent, or Firm* — IP Business Solutions, LLC

(57) ABSTRACT

A parking assistance device includes: a vehicle location acquiring unit for acquiring the current location of a vehicle; an object information acquiring unit for acquiring object information that includes information relating to locations of objects in the vicinity of the vehicle; and a target route setting unit for setting a plurality of routes between the current location and a predetermined parking space, identifying the route, of the plurality of routes, with the longest distance to the object, and, based on the identified route, setting a target route for the vehicle to travel from the current location to the predetermined parking space.

5 Claims, 8 Drawing Sheets

PARKING ASSISTANCE DEVICE

CROSS-REFERENCE TO RELATED APPLICATIONS

The present application claims priority under 35 U.S.C. § 119 to Japanese Patent Application No. 2021-188385 filed on Nov. 19, 2021. The content of the application is incorporated herein by reference in its entirety.

BACKGROUND OF THE INVENTION

Field of the Invention

The present invention relates to a parking assistance device.

Description of the Related Art

Document 1 discloses a technology relating to selecting a route for use in automatic parking. The Abstract of Document 1 states, "Problem to be Solved" section, that "when there is a plurality of routes to a single parking space, it is not possible to park automatically using a route with short parking time." In the Means for Solving the Problem" section in the Abstract there is the description of "A route candidate generating unit 301 varies the standard vehicle speed and route shape to search for a route that arrives at the parking destination from the parking starting location. A route travel time calculating unit 302 calculates the time required for traveling the route based on a standard vehicle speed and the length of the route for each individual candidate route. A state switching time calculating unit 303 calculates the time required, for each route candidate, to switch between forward and reverse vehicle travel and to turn the steering, to change to the predetermined steering angle in a state in which the vehicle is stationary. Based on the route travel times, the route selecting processing unit 305 selects a specific route, such as, for example, the route with the shortest parking time, from the routes that have been generated."

PRIOR ART DOCUMENT

Patent Document

[Patent Document 1] Japanese Unexamined Patent Application Publication 2019-127112

SUMMARY OF THE INVENTION

Problem Solved by the Present Invention

However, when an object exists in the vicinity of the route that has been selected, a vehicle occupant, such as the driver, may feel anxiety when the vehicle passes by such an object.

The object of the present invention is to provide a parking assistance device that is able to reduce the anxiety of the vehicle occupants.

SUMMARY OF THE INVENTION

One aspect of the present invention includes: a vehicle location acquiring unit for acquiring the current location of a vehicle; an object information acquiring unit for acquiring object information that includes information relating to a location of an object in the vicinity of the vehicle; and a target route setting unit for setting a plurality of routes between the current location and a predetermined parking space, identifying the route, of the plurality of routes, with the longest distance to the object, and, based on the identified route, setting a target route for the vehicle to travel from the current location to the predetermined parking space.

Effects of the Invention

One aspect of the present invention is able to reduce anxiety of the vehicle occupants.

DETAILED DESCRIPTION OF THE INVENTION

An embodiment according to the present invention will be explained below in reference to the drawings.

Figure 1:
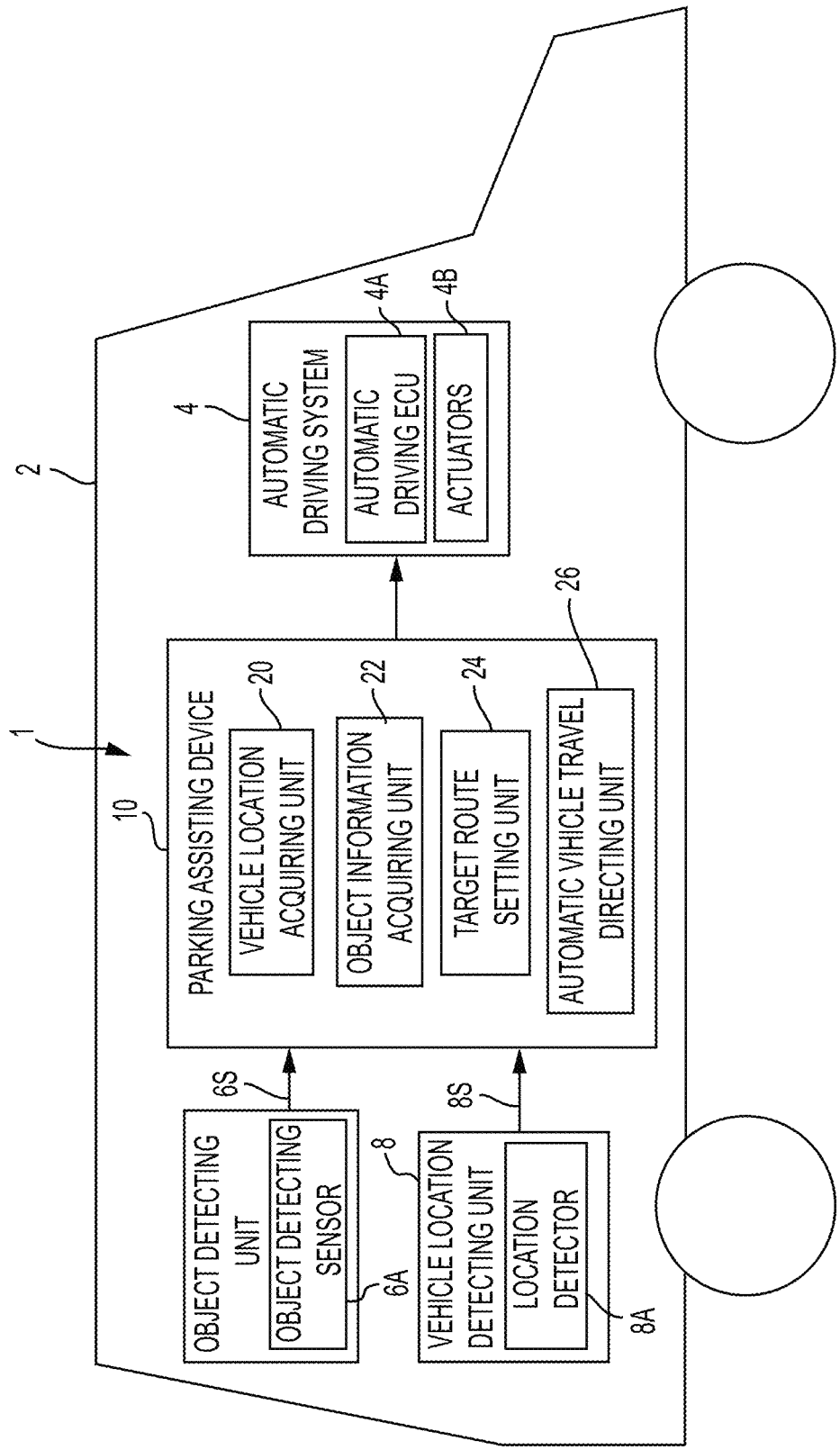
FIG. 1 is a diagram showing a structure of a parking assistance system according to an embodiment according to the present invention.

FIG. 1 is a diagram showing the structure of a parking assistance system 1 according to the present embodiment.

The parking support system 1 is a vehicle-mounted system that, when a parking area Pb (FIG. 4) exists in a parking lot or the like, for example, when a start instruction is given by an occupant such as a driver, the vehicle 2 automatically travels from the current position Pa (FIG. 4) to a predetermined parking area Pb, and the vehicle 2 automatically parks in the predetermined parking area Pb to assist the driver's driving when the vehicle 2 is parked. Automatic traveling and automatic parking refer to autonomous or semi-autonomous traveling and parking of the vehicle 2. The parking assistance system 1, as shown in FIG. 1, comprises a parking assistance device 10, an automatic driving system 4, an object detecting unit 6, and a vehicle location detecting unit 8, where these are either connected together through an in-vehicle network, such as a CAN, or the like, or are connected together directly.

The parking assistance device 10 is a device that executes a process (an automatic parking controlling process (FIG. 2) for setting a target route Q (FIG. 4) from the current location Pa to a predetermined parking space Pb, and for causing the vehicle 2 to travel along the target route Q to complete parking in the predetermined parking space Pb. This parking assistance device 10 has a computer (which, in the present embodiment, is an ECU (Electric Control Unit) comprising a processor such as a CPU (Central Processing Unit) or MPU (microprocessor), or the like), a memory device (also termed a "main storage device") such as a ROM (Read Only Memory) or a RAM (Random Access Memory), a storage device (also termed a "supplementary storage device") such as an HDD (Hard Disk Drive) or an SSD (Solid State Drive), an interface circuit for connecting to sensors, peripheral devices, or the like, and an in-vehicle network communication circuit for communicating with other in-vehicle devices through an in-vehicle network. Through the processor executing a computer program that is stored in the memory device or the storage device, the parking assistance device 10 achieves a variety of functional structures relating to automatic parking control. These functional structures will be described below.

The automatic driving system 4 is a system for executing automatic driving of the vehicle 2, and comprises an automatic driving ECU 4A for executing control of the automatic driving, and various actuators 4B for causing the vehicle 2 to travel. The automatic driving system 4 parks the vehicle 2 in a predetermined parking space Pb through the automatic driving ECU 4A causing the vehicle 2 to travel automatically along a target route Q, through controlling the various actuators 4B based on output signals from the parking assistance device 10.

The actuators 4B include, for example, a vehicle driving actuator, a brake actuator, and a steering actuator. The vehicle driving actuator is a device or system that includes a motive source (a motor or engine) for the vehicle 2, and a control device (an ECU, or the like) for controlling the motive source. The brake actuator is a device or system for actuating the braking system equipped in the vehicle 2. The steering actuator is a device or system for actuating assist motors for controlling the steering torque of an electric power steering system.

Note that the automatic driving system 4 may use, arbitrarily, a publicly known or well-known system that enables vehicle 2 to travel autonomously or semi-autonomously.

The object detecting unit 6 comprises an object detecting sensor 6A for detecting an object K in the vicinity of the vehicle 2 (FIG. 4), to output a detection signal (hereinafter termed the "object detection signal 6S") to the parking assistance device 10. In the present embodiment, vehicle-mounted cameras (that is, CCD sensors) that image the vicinity of the vehicle 2 and output imaging data to the parking assistance device 10 are used as the object detecting sensor 6A. These vehicle-mounted cameras include a front camera for imaging forward from the vehicle 2, a rear camera for imaging rearward, a left side camera for imaging toward the left side, and a right side camera for imaging toward the right side, where the various data captured by these cameras are used to produce a captured image of the entire periphery (in a 360° range) of the vehicle 2.

An object K may be any object that is indicated on the travel route of the vehicle 2, and any object that would interfere with the travel of the vehicle 2. The object K may be, for example, a passageway, a parking space, a stop line, a white line, another vehicle, a structure (a building, wall, signal, sign, or the like), a pedestrian, or the like.

Additionally, in addition to the vehicle-mounted cameras, a LiDAR (Light Detection and Ranging), radar, sonar, or the like, which may be used either singly or in combinations thereof, may be used appropriately as the object detecting sensor 6A of the object detecting unit 6.

The vehicle location detecting unit 8 comprises a location detector 8A that detects the location of the vehicle 2 itself and outputs a detection signal (hereinafter termed the "vehicle location detection signal 8S") to the parking assistance device 10. An arbitrary publicly known device such as, for example, a receiver for receiving a GNSS (Global Navigation Satellite System) signal, a gyro sensor, an acceleration sensor that is used in autonomous navigation, or another publicly known sensor may be used arbitrarily in the location detector 8A.

The parking assistance device 10 comprises, as its functional structure, a vehicle location acquiring unit 20, an object information acquiring unit 22, a target route setting unit 24, and an automatic travel directing unit 26.

The vehicle location acquiring unit 20 acquires the current location Pa by calculating the current location Pa of the vehicle 2 based on the vehicle location detection signal 8S of the vehicle location detecting unit 8.

The object information acquiring unit 22 acquires information regarding objects K in the vicinity of the vehicle 2 (hereinafter termed "object information A") by analyzing an object detection signal 6S (which, in the present embodiment, is imaging data) from the object detecting unit 6.

The object information A is information that is used in setting the target route Q. The target route Q in the present embodiment is set as a route wherein the vehicle 2 will not contact an object K and will not cause the vehicle occupant to feel anxiety when the vehicle 2 passes by the objects K. The object information A includes, as information for setting the target route Q, the locations and sizes (such as the outer dimensions, shapes, and the like) of the objects K.

Note that the object information acquiring unit 22 may be structured so that the object information acquiring unit 22 will acquire the object information A by generating object information A through analyzing information detected by the object detecting unit 6 or by other suitable devices, rather than structured to analyze the object information A itself. The techniques for analyzing and generating object information A based on the information detected by the object detecting unit 6 may use an appropriate publicly known or well-known technique such as, for example, an image recognition process.

The target route setting unit 24 sets the target route Q based on the current location Pa, the location of the predetermined parking space Pb, and the object information A.

Specifically, the target route setting unit 24, based on the locations and sizes of objects K in the vicinity of the vehicle 2, sets the target route Q to be a route from the current location Pa to the predetermined parking space Pb without the vehicle 2 contacting an object K, so is able to reduce the feeling of anxiety by the vehicle occupant when the vehicle 2 passes by the objects K.

Note that the target route setting unit 24 may reference map data that indicates a map of the vicinity, when setting the target route Q. The map data may be stored in advance in the parking assistance device 10, or may be received through an electronic communication circuit (for example, the Internet) from a device (for example, a system for controlling a parking lot) that is external to the vehicle 2.

Additionally, the technique for setting the predetermined parking space Pb is arbitrary, and may use, for example, a technique wherein the vehicle occupant provides direction, such as specifying a location on a map, or a technique wherein a publicly known or well-known technique is used to detect a space wherein the vehicle 2 can park, and setting that space as the parking space.

The automatic travel directing unit 26 generates output signals to direct the automatic travel of the vehicle 2 along the target route Q that has been set by the target route setting unit 24, and outputs the output signals to the automatic driving system 4. Additionally, the automatic travel directing unit 26 is equipped with a function for directing the automatic driving system 4 so as to park the vehicle 2 into a predetermined parking space Pb. Note that the technique for parking the vehicle 2 into the parking space Pb using the automatic driving system 4 may use an arbitrary publicly known or well-known technique.

Figure 2:
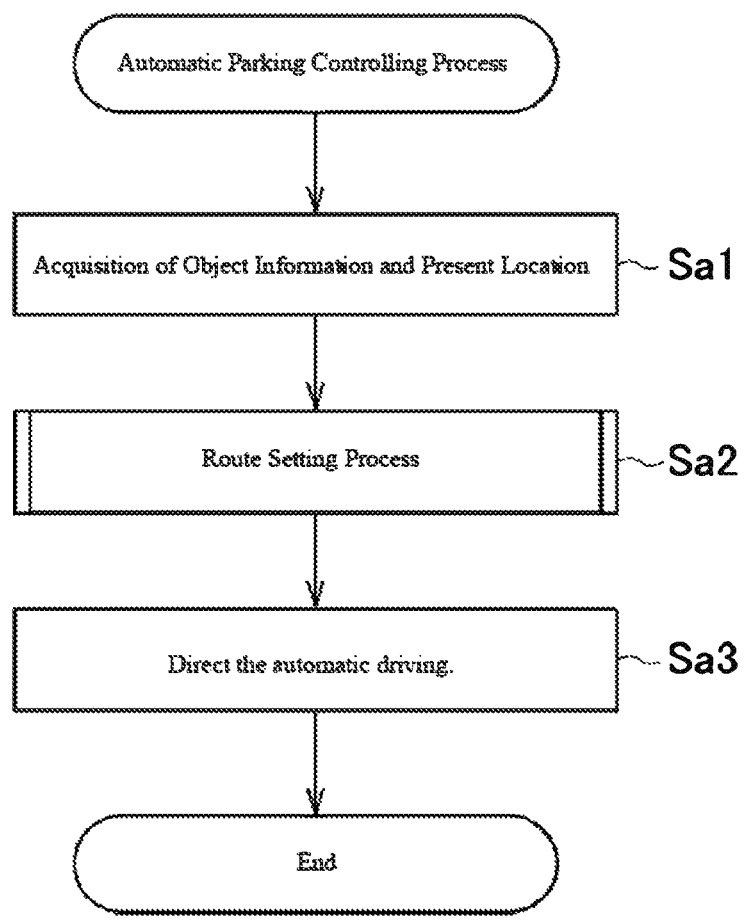
FIG. 2 is a flowchart of an automatic parking controlling process executed by the parking assistance device.

FIG. 2 is a flowchart for an automatic parking controlling process executed by the parking assistance device 10.

When a vehicle occupant inputs an instruction to execute automatic parking by operating a switch that is provided in the vehicle 2 or a mobile electronic device carried by the vehicle occupant (for example, a smart phone), the execution instruction is inputted into the parking assistance device 10, and the parking assistance device 10 starts the automatic parking controlling process shown in this figure.

In the automatic parking controlling process, first the vehicle location acquiring unit 20 acquires the current location Pa of the vehicle 2, and the object information acquiring unit 22 acquires object information A for objects K in the vicinity of the vehicle 2 (Step Sa1). Next the target route setting unit 24 executes a route setting process (FIG. 3), described below, to set the target route Q (Step Sa2). Then, the automatic travel directing unit 26 outputs the above output signals to the automatic driving system 4, to provide direction for automatic driving to the automatic driving system 4 (Step Sa3). Through this, the vehicle 2 will travel automatically along the target route Q, under the control of the automatic driving system 4, to complete parking in the predetermined parking space Pb.

Figure 3:
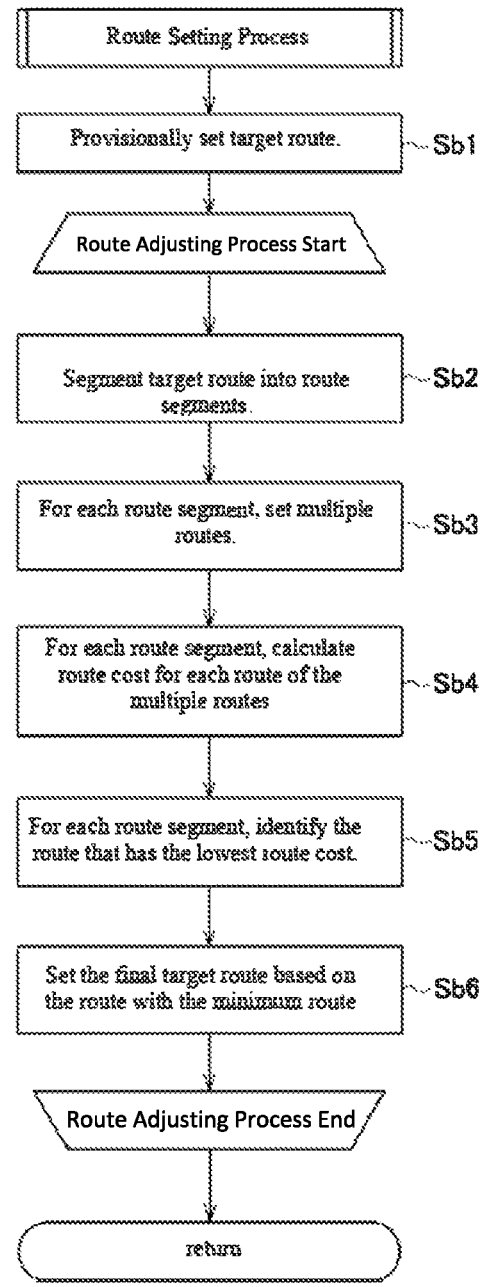
FIG. 3 is a flowchart of a route setting process.
Figure 4:
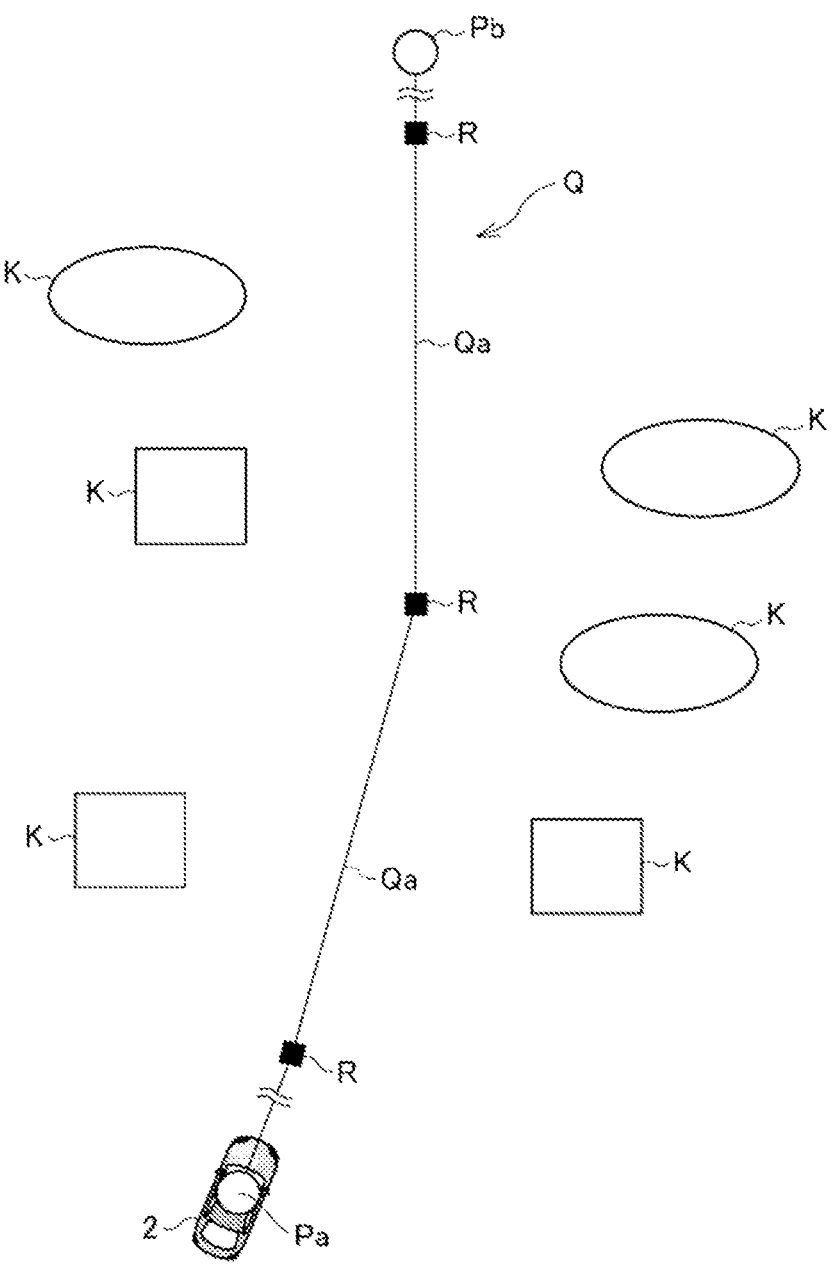
FIG. 4 is an explanatory diagram regarding the route setting process.
Figure 5:
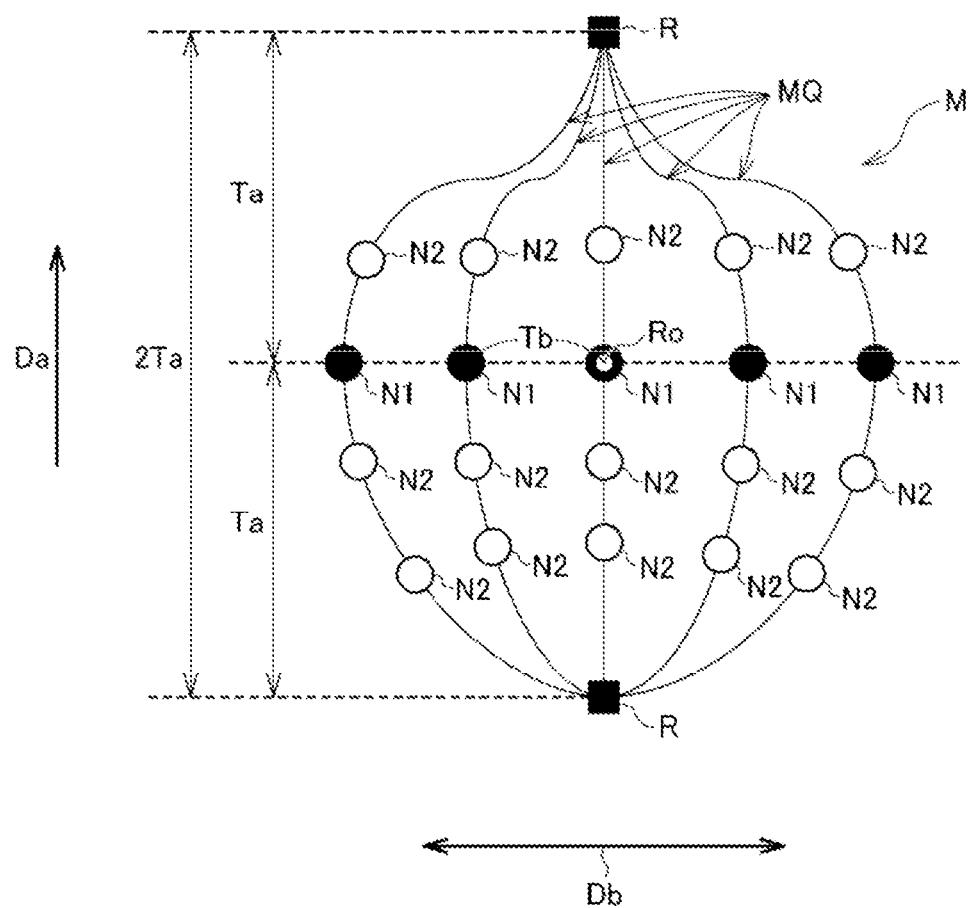
FIG. 5 is a schematic diagram of the multiple paths used in the route setting process.

FIG. 3 is a flowchart of the route setting process referenced above, and FIG. 4 is an explanatory diagram regarding the route setting process. FIG. 5 is a schematic diagram of multiple paths M used in the route setting process.

The target route setting unit 24 first sets (provisionally) a target route Q based on the object information A (Step Sb1). In this case, the target route Q that has been set is a route that enables the vehicle 2 to travel from the current location Pa to the predetermined parking space Pb without contacting an object K, as shown in FIG. 4. That is, the target route setting unit 24, in Step Sb1, identifies a surrounding region wherein the vehicle 2 can travel without contacting the objects K, based on the locations and sizes of the objects K in the vicinity of the vehicle 2, to set a route from the current location Pa to the predetermined parking space Pb within the range of that surrounding region.

The target route setting unit 24 then executes a route adjusting process to adjust the target route Q. The route adjusting process is a process for adjusting the target route Q to a route that is able to reduce the anxiety of the vehicle occupant when the vehicle 2 passes by an object K.

Specifically, first the target route setting unit 24 segments the target route Q, set in Step Sb1, into a plurality of route segments Qa, as shown in FIG. 4 (Step Sb2). In the present embodiment, the individual route segments Qa are segmented by predetermined travel distances. While the length of the predetermined travel distance is arbitrary, in the present embodiment it is set to between 10 and 20 m (to a multiple of the length of the vehicle 2, for example).

Next the target route setting unit 24 adjusts the route for each route segment Qa.

Specifically, first the target route setting unit 24 sets multiple paths M to endpoints R on both ends of each route segment Qa (Step Sb3). The multiple paths M, as shown in FIG. 5, are at least two routes MQ (which, in the illustrated example, is five routes) that connect the endpoints R on both ends of the route segment Qa, where routes MQ are set with mutually differing waypoints for the vehicle 2 in the crosswise direction Db (the vehicle width direction) that is perpendicular to the direction of travel Da.

The target route setting unit 24 in the present embodiment sets the multiple paths M as follows.

Specifically, as shown in FIG. 5, in a route segment Qa, the target route setting unit 24 specifies a midpoint Ro with equal distances Ta to the endpoints R on both ends, and sets a plurality of first nodes N1, with predetermined spacing Tb, on a straight line that extends in the crosswise direction Db that passes through the midpoint Ro. Note that the direction of travel Da is the direction that connects the endpoints R on both ends with a straight line, and the crosswise direction Db is the direction that is perpendicular to the travel direction Da. Following this, the target route setting unit 24 sets, for each of the first nodes N1, a route MQ that passes through the applicable first load N1 from one end point R to arrive at the other end point R. Multiple paths M, that include multiple routes MQ, are set thereby. If object information A for an object K that is a marker for a travel route that is a road or a white line can be acquired, the target route setting unit 24 may reference the object information A to set the route MQ within the range of that travel route.

Returning to FIG. 3, referenced above, the target route setting unit 24 identifies a route, from among the individual routes MQ of the multiple paths M, that can reduce the anxiety felt by the vehicle occupant when the vehicle 2 passes by the object K. Describing this in detail, the anxiety felt by the vehicle occupant is anxiety regarding contact when the vehicle 2 passes by the object K, and is felt more strongly the shorter the distance between the object K and the vehicle 2 (hereinafter termed the vehicle-object distance). Because of this, from among the routes MQ in the multiple paths M, having the vehicle 2 travel a route MQ wherein the vehicle-object distance is long will reduce this anxiety.

The target route setting unit 24 in the present embodiment identifies a route MQ with a long vehicle-object distance as follows.

Specifically, first the target route setting unit 24 calculates a route cost C for each route MQ of the multiple paths M (Step Sb4). The route cost C is a parameter calculated based on the vehicle-object distance for the target route MQ, and is a parameter whose value decreases as the vehicle-object distance increases.

The target route setting unit 24 next identifies the route MQ, from among the individual routes MQ of the multiple paths M, that minimizes the route cost C, that is, the longest vehicle-object distances (Step Sb5). The target route setting unit 24 next sets the final target route Q by connecting together the routes MQ identified for each of the route segments Qa (Step Sb6).

Figure 6:
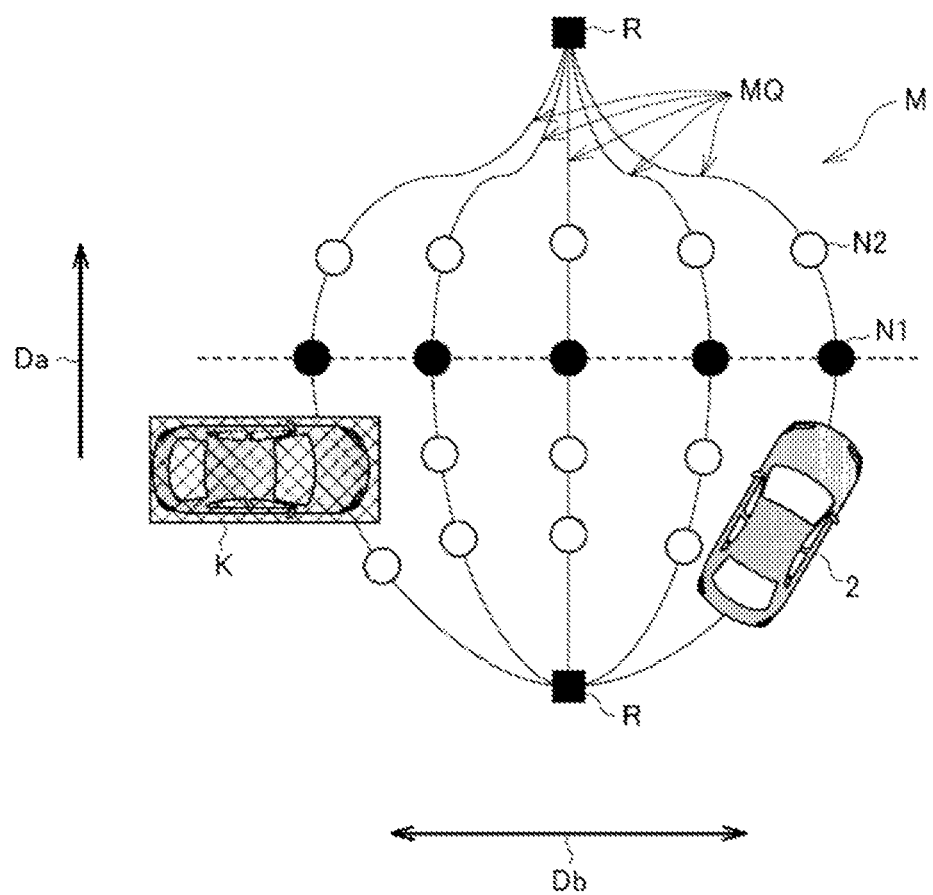
FIG. 6 is a schematic diagram showing identification of the route with the minimum route cost.

When the vehicle 2 travels along the target route Q, as shown in FIG. 6, the vehicle 2 travels along the route MQ farthest from the object K present in the target route segment Qa among the multipaths M in any of the route segments Qa, thereby reducing the anxiety of the occupant when the vehicle 2 passes by the object K.

A method for calculating the route cost C, described above, will be described in detail next.

The target route setting unit 24 according to the present embodiment calculates the route cost C, for each individual route MQ of the multiple paths M, as follows. Specifically, as shown in FIG. 5, for each individual route MQ of the multiple paths M, the target route setting unit 24 sets second nodes N2, at predetermined intervals, from the first nodes N1, and calculates a node cost Cn for each of the first nodes N1 and second nodes N2. The node cost Cn is a parameter whose value becomes smaller as the vehicle-object distance becomes longer when the vehicle 2 is located at the first node N1 and the second node N2. In this embodiment, the vehicle-side distance rs is used as the vehicle-object distance.

Figure 7:
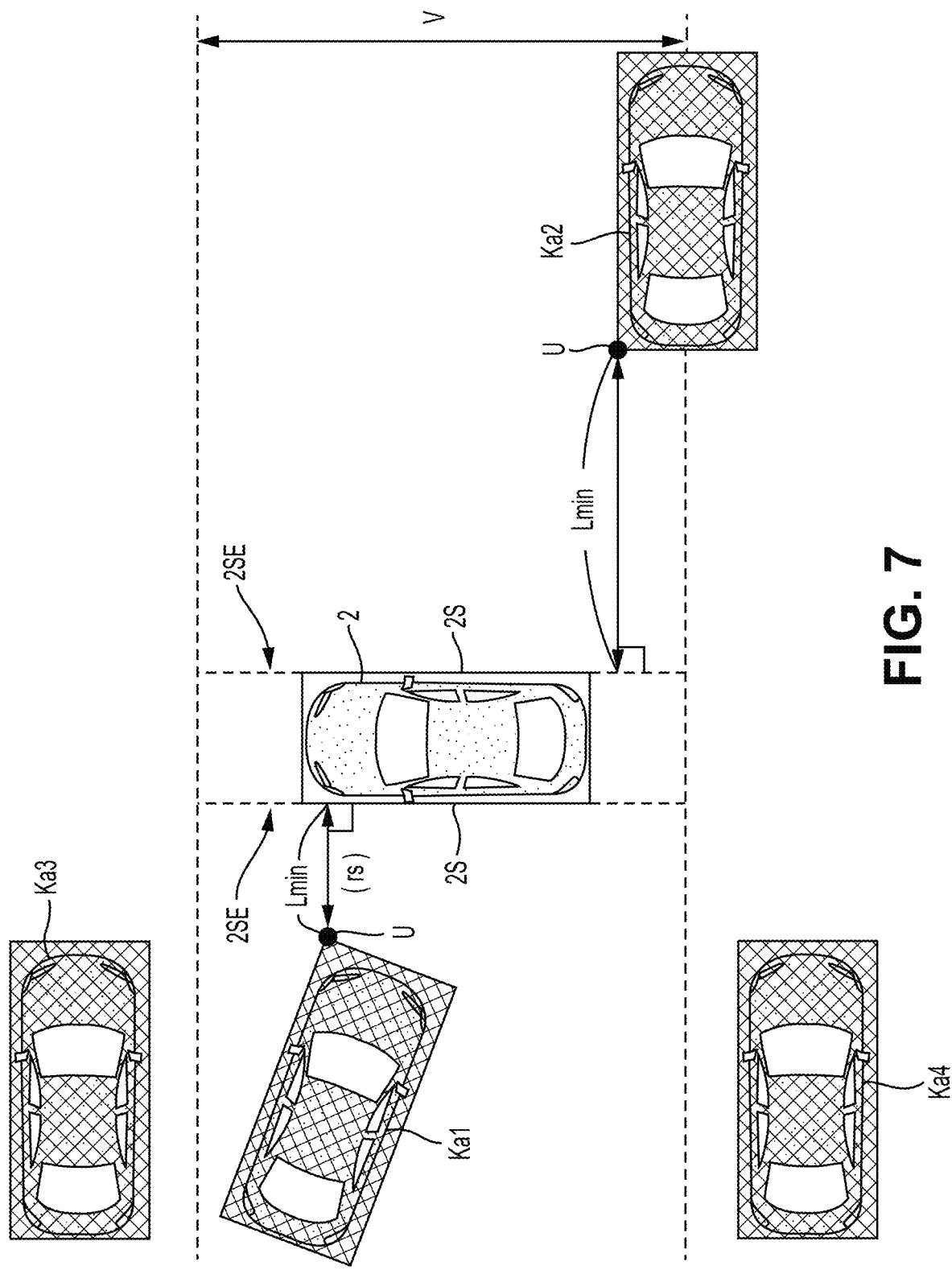
FIG. 7 is an explanatory diagram regarding the distance to the side of the vehicle.

FIG. 7 is an explanatory diagram for the distance rs to the side of the vehicle. Note that in this diagram, four other vehicles Ka1 to Ka4 are illustrated as examples of objects K.

The distance rs to the side of the vehicle is the shortest distance Lmin to the object K from an extension of the vehicle side face 2SE. As shown in FIG. 7, the extensions of the vehicle side faces 2SE are planes that extend, in the lengthwise direction of the vehicle 2, the side faces 2S on the left and right of the vehicle 2 at the applicable first node N1 or second node N2, and are reference planes that serve as a metric for screening the objects K to be subject to the calculations of the distances rs in the direction to the side of the vehicle (the node cost Cn).

Specifically, in a range V, in the lengthwise direction of the vehicle, of the extension of the vehicle side face 2SE, each object K (the other vehicles Ka1 through Ka4) that exists in the crosswise direction Db of the extension of the vehicle side face 2SE is selected as the object for calculating the distance rs in the direction to the side of the vehicle.

In the example in FIG. 7, the target route setting unit 24 excludes, from being objects for calculating the distance rs in the direction to the side of the vehicle, the two other vehicles Ka3 and Ka4 that are outside of the range V, in the vehicle lengthwise direction, of the extension of the vehicle side face 2SE, and selects, as objects for calculating the distances rs in the direction to the side of the vehicle, both of the remaining other vehicles Ka1 and Ka2.

Note that the target route setting unit 24 sets the extension length, in the vehicle lengthwise direction, of the extension of the vehicle side face 2SE, to a length that is proportional to the vehicle speed when the vehicle 2 passes through the applicable first node N1 or second node N2. This causes the range V, in the vehicle lengthwise direction, of the extension of the vehicle side face 2SE to be greater the faster the vehicle speed, so that objects K that are even farther away from the vehicle 2 will be selected as objects for the calculation of the distances rs in the direction to the side of the vehicle (the node costs Cn).

The target route setting unit 24, upon selection of objects K for the calculation of distances rs in the direction to the side of the vehicle, identifies, based on the object information A, the nearest points U to the extension of the vehicle side face 2SE for each of the outer dimensions (profiles) of these objects K, and defines, as the distance rs in the direction to the side of the vehicle, the shortest distance Lmin that is the shortest of all of the shortest distances Lmin between the extension of the vehicle side face 2SE and each of the points U. In the example in FIG. 7, the other vehicle Ka1 is closer than the other vehicle Ka2, and thus the target route setting unit 24 calculates the shortest distance Lmin from the point U on the outer shape of the other vehicle Ka1 to the extension of the vehicle side face 2SE as the distance rs in the direction to the side of the vehicle.

The target route setting unit 24 next calculates the node cost Cn using the following Equation (1) based on the distance rs in the direction to the side of the vehicle. Note that in Equation (1), $\alpha$ is a constant.

$$Cn = \alpha/(rs \times rs) \quad (1)$$

Given this, the target route setting unit 24 uses the following Equation (2) to calculate the total cost value of the node costs Cn for each route MQ as the route cost C:

$$\text{Route cost } C = \Sigma \text{node cost } Cn \quad (2)$$

This calculation enables reliable identification of the route MQ with the longest vehicle-object distances when the vehicle 2 passes by the objects K, based on the route cost C, because the value of the route cost C will be less for routes MQ that include many first nodes N1 and second nodes N2 that have long distances rs in the direction to the side of the vehicle.

Next the target route setting unit 24, in calculating the node costs Cn using Equation (1), sets the value of the node cost Cn to be extremely large if there is an object K that exists on the extension of the vehicle side face 2SE (that is, if the shortest distance Lmin is less than zero, meaning that there is an object K with which the vehicle 2 may collide). This makes it possible to prevent reliably the inclusion, in the final target route Q, of a route MQ wherein the vehicle 2 could collide with the object K.

Moreover, in the present embodiment, control is carried out so as to cause the vehicle occupant to have a greater sense of safety by having the vehicle speed be relatively slow when the distance rs in the direction to the side of the vehicle is relatively small when the vehicle 2 passes by an object K.

Specifically, in Step Sa3 of the automatic parking controlling process, shown in FIG. 2, presented above, the automatic travel directing unit 26 executes the following process when outputting the output signals to the automatic driving system 4. Specifically, the automatic travel directing unit 26 determines whether or not a first node N1 or second node N2 with a node cost Cn that is greater than a predetermined value is included in the target route Q that was ultimately set by the target route setting unit 24, that is, determines whether or not a first node N1 or second node N2 is included where the vehicle 2 will pass by the object K with a distance rs in the direction to the side of the vehicle that is less than the predetermined value. Given this, if such a first node N1 or second node N2 is included, the automatic travel directing unit 26 outputs output signals directing the automatic driving system 4 to have the vehicle speed be no greater than a predetermined speed that is slower than the normal vehicle speed (at a low speed) when passing through the applicable first node N1 or second node N2.

Figure 8:
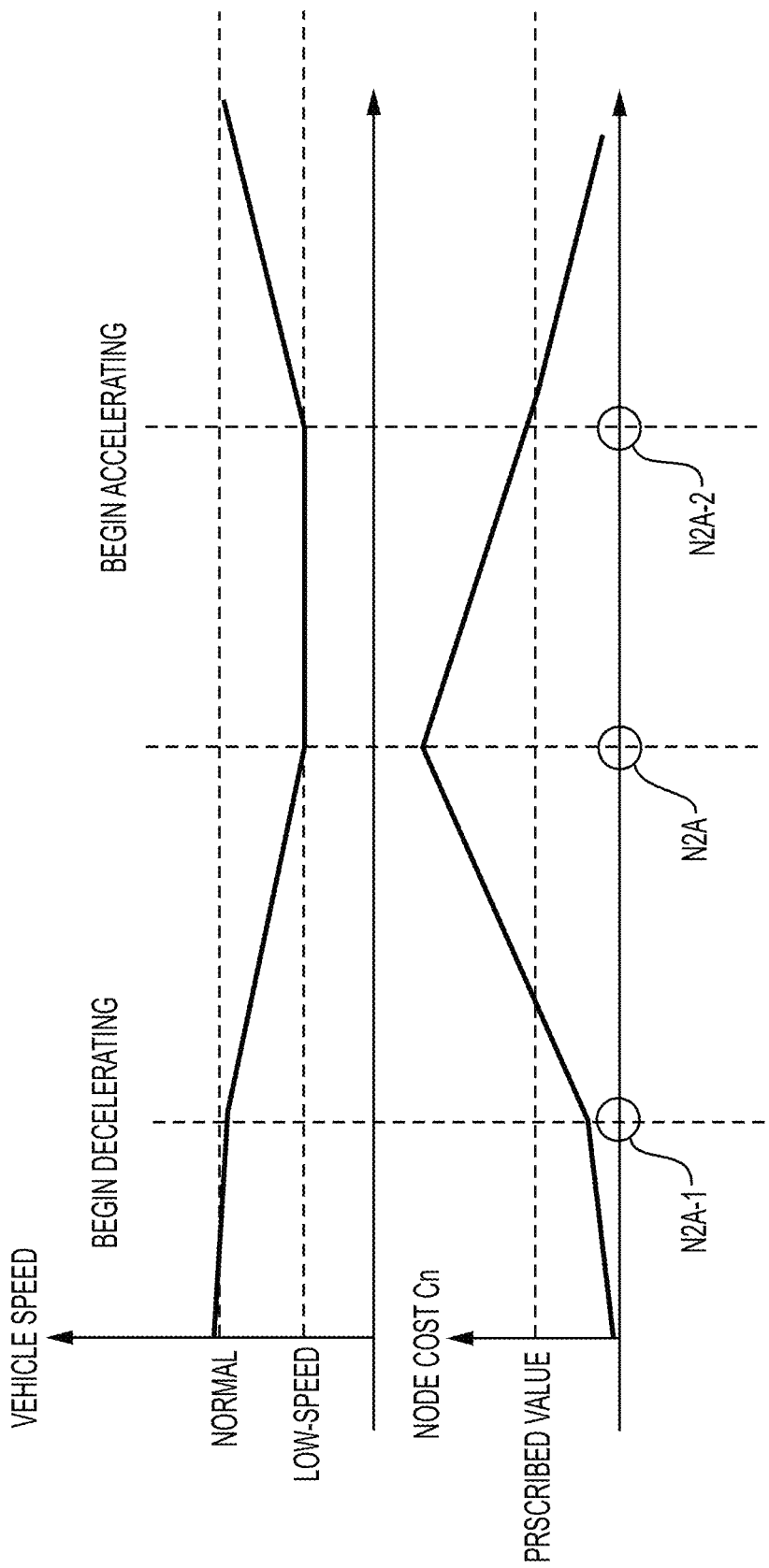
FIG. 8 is an explanatory diagram of vehicle speed control depending on node costs.

Specifically, as shown in FIG. 8, for example, when the node cost Cn of a second node N2A exceeds a predetermined value, the automatic travel directing unit 26 outputs directions to decelerate the vehicle 2 from the normal vehicle speed (the vehicle speed that has been set in advance as the vehicle speed for automatic travel) from a second node N2A-1 prior to passing through the second node N2A, and to accelerate so as to restore the vehicle 2 to the normal vehicle speed beginning with a second node N2A-2 after passing through the second node N2A.

This makes it possible to cause the vehicle occupant to have a feeling of safety, given that the vehicle 2 will pass by the object K in an adequately low-speed state through decelerating the vehicle 2 prior to passing the object K, if the vehicle 2 is to pass by an object K with a distance rs in the direction to the side of the vehicle that is less than the predetermined value.

Note that if the node cost Cn is less than a predetermined threshold value, that is, if the vehicle 2 passes by an object K with a distance rs in the direction to the side of the vehicle that is greater than a predetermined threshold value, the automatic travel directing unit 26 outputs a direction to increase the speed of the vehicle 2 to greater than the normal vehicle speed.

The present embodiment has effects such as described below.

The parking assistance device 10 according to the present embodiment is equipped with a target route setting unit 24 that sets a plurality of routes MQ between the current location Pa of the vehicle 2 and a predetermined parking space Pb, identifies the route MQ, from among the plurality of routes MQ, that has the longest distance from the object K, and, based on the identified route MQ, sets the target route Q for the vehicle 2 to travel from the current location Pa to the predetermined parking space Pb.

According to this configuration, since the route MQ farthest from the object K is set to the target route Q, the occupant can be reduced the anxiety that feels when the vehicle 2 passes by the object K as compared with the case where the vehicle 2 passes near the object K.

In the parking assistance device 10 according to the present embodiment, the target route setting unit 24 sets a first node N1 and a second nodes N2 for each of the plurality of routes MQ, and calculates a node cost Cm for which the value becomes smaller as the distance between the first node N1 and the second nodes N2 and the object K is longer for each of the first node N1 and the second nodes N2. Next, the target route setting unit 24 calculates, for each of the plurality of routes MQ, a route cost C that is a sum of the node costs Cn of the first node N1 and the second nodes N2 included in the route MQ. The target route setting unit 24 identifies a route MQ having the smallest route cost C among the plurality of routes MQ, and sets the target route Q based on the identified route MQ.

This structure makes it possible to quantify the distances between the routes MQ and the object K, for each of a plurality of routes MQ, to make accurate comparisons.

In the parking assistance device 10 according to the present embodiment, the node cost Cn is a parameter that becomes smaller as the shortest distance Lmin between the object K and a side face 2S of the vehicle 2 that is located at the first node N1 and the second nodes N2 is longer.

This makes it possible to calculate the node cost Cn based on the shortest distance Lmin between the object K and the vehicle 2 when the vehicle 2 passes by the object K (that is, when the object K is located to the side of the vehicle 2).

In the parking assistance device 10 according to the present embodiment, the target route setting unit 24 calculates the node cost Cn for an object K that exists in a range V from an extension of the vehicle side face 2SE wherein the side face 2S of the vehicle 2 that is located at the first node N1 or a second node N2 is extended in the vehicle lengthwise direction depending on the speed of the vehicle 2.

This makes it possible to calculate the node cost Cn for only the object K that is present by the vehicle 2 when the vehicle 2 passes through the first node N1 or the second node N2.

The parking assistance device 10 according to the present embodiment includes the automatic travel directing unit 26. When a first node N1 and a second node N2 having a node cost Cn of a predetermined value or more are included in a target route Q set by a target route setting part 24, the automatic travel directing unit 26 instructs the automatic driving system 4 to set a vehicle speed when passing through the first node N1 and the second node N2 having a node cost Cn of a predetermined value or more to a predetermined speed or less.

This structure decelerates the vehicle 2 so as to be no more than a predetermined speed when the vehicle 2 passes by the object K with a short distance rs in the direction to the side of the vehicle such that the node cost Cn will be higher than a predetermined value. This will cause the vehicle occupant to have a feeling of safety, despite the distance rs in the direction to the side of the vehicle being relatively short, given that the vehicle 2 will pass by the object K in a state wherein it is traveling adequately slowly.

In the parking assistance device 10 according to the present embodiment, the target route setting unit 24 segments a target route Q from the current location Pa to a predetermined parking space Pb into a plurality of route segments Qa, and sets a plurality of routes MQ (multiple paths M) for each route segment Qa, identifies the routes MQ with the longest distances from the object K for each of the route segments Qa, and sets the target route Q based on the individual routes MQ that have been identified.

This structure makes it possible to set accurately a target route Q that secures distances from each of the objects K such that the vehicle occupant will not feel anxiety, given that the target route Q is segmented into a plurality of route segments Qa and the route MQ that has the longest distance from each object K in each of the route segments Qa is identified, even in a case wherein, for example, the route length of the target route Q is relatively long, and the route extends past a large number of objects K.

The above embodiment is no more than an illustration of one aspect of the present invention, and can be modified and applied suitably in a range that does not deviate from the spirit and intent of the present invention.

For example, in the automatic parking control process shown in FIG. 2, presented above, after the automatic travel directing unit 26 has outputted directions to the automatic driving system 4 (Step Sb3), the parking assistance device 10 may monitor whether or not there is an object K (for example, another vehicle, a pedestrian, or the like) that is moving toward the target route Q, based on an object detection signal 6S of the object detecting unit 6, and, upon detection of said object K, the automatic travel directing unit 26 may provide direction to the automatic driving system 4 to stop the vehicle 2.

Additionally, for example, the target route setting unit 24 may also reflect the movement speed of the object K into the node cost Cn. For example, the target route setting unit 24 may increase the value of the node cost Cn more greatly with faster speeds of movement of objects K toward the first node N1 or a second node N2.

In the above embodiment, the functional blocks shown in FIG. 1 are schematic diagrams indicating classifications depending on the main processing details of the structural elements of the parking assistance system 1 and the parking assistance device 10, to facilitate understanding of the invention according to the present application.

Consequently, the structural elements of the parking assistance system 1 and the parking assistance device 10 can be partitioned into a greater number of structural elements (functional blocks) depending on the processing details. Moreover, the partitioning may be such that a single structural element will execute a greater number of processes.

In addition, the processes of each of the structural elements of the parking assistance device 10 shown in FIG. 1 may instead be executed in a single hardware element, or in a plurality of hardware elements. Additionally, the processes of each of the structural elements may be achieved through a single program or achieved through a plurality of programs.

Unless stated explicitly otherwise, directions, such as horizontal and vertical directions, and various other types of numeric values, shapes, materials, and the like, in the embodiment set forth above include ranges that produce the same effects in operation as those directions, numeric values, shapes, and materials (so-called "scope of equivalency").

EXPLANATIONS OF REFERENCE SYMBOLS

1: Parking assistance system
2: Vehicle
10: Parking assistance device
K: Object
Lmin: Shortest distance
M: Multiple paths
Q: Target route
rs: Distance in the direction of the side of the vehicle

What is claimed is:

1. A parking assistance device comprising:
a processor,
wherein the processor
acquires a current location of a vehicle;
acquires object information that includes information relating to a location of an object in the vicinity of the vehicle;
based on the location and size of the object in the vicinity of the vehicle, sets a target route to be a route from the current location to a predetermined parking space without the vehicle contacting the object;
divides the target route into a plurality of route segments in a predetermined travel distance;
sets a plurality of routes which connect endpoints on both ends of the route segment in each of the plurality of route segments, wherein the plurality of routes are set with mutually differing waypoints for the vehicle in a crosswise direction that is perpendicular to a direction of travel, identifying the route having the longest distance to the object among the plurality of routes, and sets a final target route for the vehicle to travel from the current location to the predetermined parking space based on the identified route.

2. The parking assistance device according to claim 1, wherein the processor
sets a plurality of nodes in each of the plurality of routes,
calculates node cost which becomes smaller as the distance between the node and the object becomes longer for each of the nodes,
calculates, for each of the plurality of routes, a route cost that is a total value of the node costs of each of the plurality of nodes included in the route, and
identifies the route having the lowest route cost from the plurality of routes, and a final target route is set based on the identified route.

3. The parking assistance device according to claim 2, wherein
the node cost is a parameter whose value becomes smaller as the shortest distance between the side face of the vehicle located at the node and the object is longer.

4. The parking assistance device according to claim 2, wherein
the processor calculates the node cost for an object that exists in a range of an extended vehicle side face wherein the side face of the vehicle that is located at the node is extended in the vehicle lengthwise direction depending on the speed of the vehicle.

5. The parking assistance device according to claims 2, wherein the processor
directs vehicle travel along a travel route that has been set, for an automatic driving system equipped in the vehicle to carry out automatic driving of the vehicle, wherein:
when a target route that has been set includes an aforementioned node having an aforementioned node cost that is no less than the predetermined value, the processor directs the automatic driving system so that the vehicle speed, when passing through the node that has the node cost that is no less than the predetermined value, will be no greater that a predetermined value.

* * * * *